Feb. 22, 1966  G. WINTRISS  3,236,350
CONTROL APPARATUS FOR AUTOMATIC MACHINE
Filed July 24, 1963
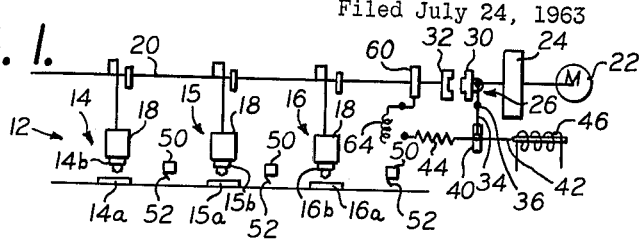
FIG. 1.
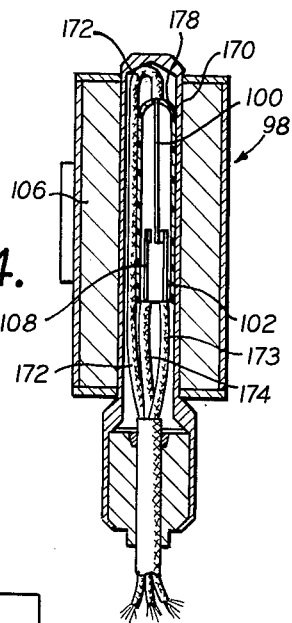
FIG. 4.
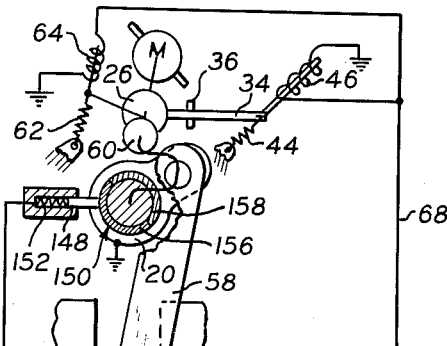
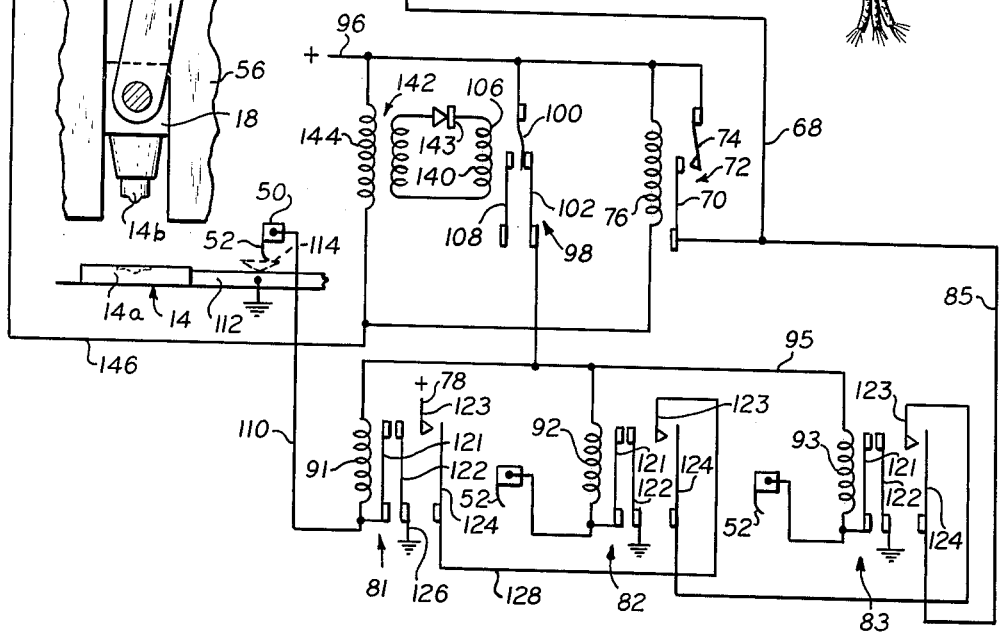
FIG. 2.
FIG. 3.
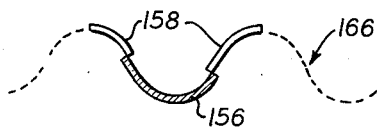
INVENTOR
George Wintriss
BY Emery, Whittemore
Sandoe & Graham
ATTORNEYS.

United States Patent Office 3,236,350
Patented Feb. 22, 1966

3,236,350
CONTROL APPARATUS FOR AUTOMATIC
MACHINE
George Wintriss, Carversville, Pa.
Filed July 24, 1963, Ser. No. 297,357
12 Claims. (Cl. 192—125)

This invention relates to control equipment for machines, and more especially for equipment for detecting malfunctioning of the machine and for stopping the operation of the machine before any damage results.

With slow-speed machines it was possible for an alert operator to watch the operation and stop the machine by manual control if a work piece was not ejected from a die, if a work piece was not transferred from one work station to another, or if any other condition arose that was likely to cause expensive damage to the equipment unless the machine was immediately stopped. It is no longer possible to protect machines by manual control. Good operators are harder to find, and speeds of machines have been increased so that manual operation is seldom quick enough to protect the machine from damage. In many cases, automation results in operations that are not constantly watched by an attendant.

It is an object of this invention to provide improved control means for detecting malfunctioning of a machine and for stopping the machine promptly whenever necessary. Another object is to provide such control means with apparatus that is more rugged and more reliable than that previously used, and more particularly to avoid the use of electronic apparatus which changes its characteristics with the passage of time.

Another object, in the preferred embodiment of the invention, is to provide improved control equipment which uses electric pulses at the electrical potential of the machine frame. This is ordinarily ground potential, and the invention operates with feelers in low-voltage circuits. The improved control equipment requires somewhat higher current density than is used with electronic controls and in the preferred construction, the present invention utilizes enclosed reed-type switches for handling the current flow in a safe and reliable manner. It may be said, therefore, to be another object of the invention to combine magnetically-operated reed-type switches with pulse-operated control equipment to obtain more rugged apparatus and more reliable operation over extended periods of time and without the adjustments that have proved necessary, at frequent intervals, with electronic controls.

Other objects, features and advantages of the invention will appear or be pointed out as the description proceeds.

In the drawing, forming a part hereof, in which like reference characters indicate corresponding parts in all the views:

FIGURE 1 is a diagrammatic view of an automatic machine having several work stations at which operations are performed successively on a work piece;

FIGURE 2 is a diagrammatic view showing one of the work stations in greater detail and showing the wiring diagram for three work stations;

FIGURE 3 is a chart showing the correlation of the operation of the switches of the different electric circuit controllers; and FIGURE 4 is a detail, sectional view of one of the switches used in the circuit controllers.

FIGURE 1 shows an automatic machine, indicated generally by the reference character 12 and having three successive work stations 14, 15 and 16. At the work stations 14, 15 and 16 there are dies including fixed portions 14a, 15a and 16a, respectively, and there are movable die portions 14b, 15b and 16b, respectively. The movable die portions are carried by rams, each of which is indicated by a reference character 18 and these rams are operated from a crank shaft 20 driven from a motor 22.

There is a flywheel 24 on the power shaft from the motor 22 and there is a clutch 26 between the flywheel 24 and the crank shaft 20. This clutch 26 includes a driving jaw 30 which is movable into and out of engagement with a driven jaw 32. The jaw 30 is moved to engage and disengage the clutch by a yoke lever 34 which rocks about a fulcrum 36.

The lower end of the lever 34 is connected, by a pin-and-slot connection 40, to an operating rod 42. The operating rod 42 is pulled by a spring 44 in a direction to disengage the clutch 26. There is a solenoid 46 at the other end of the operating rod for pulling the operating rod against the tension of the spring 44 whenever the solenoid 46 is energized. The clutch 26 is engaged, therefore, by supplying power to the solenoid 46. This driving mechanism is representative of motion-transmitting connections by which a motor may be connected to, or disconnected from, a machine which is driven by the motor.

Successive work pieces or stock are delivered to the work station 14; and after each operation at the work station 14, a work piece is transferred automatically to the work station 15 by feed means which are not illustrated but which are well known in the art. After an operation on the work piece at the work station 15, the work piece is automatically transferred to the work station 16, and from this work station to any successive work stations or to a delivery chute, depending upon the number of operations which the machine performs.

The illustration of the mechanism for transferring work pieces from one station to the next is unnecessary for a complete understanding of this invention; but there are detectors 50 beyond each work station 14, 15 and 16 and each detector has a finger 52 which extends into the path of movement of the work piece as it travels from one work station to the next.

FIGURE 2 is also a diagrammatic view, but it shows the construction in somewhat greater detail. The ram 18 moves up and down in bearings 56, and is connected with the crank shaft 20 by a connecting rod 58. FIGURE 2 also shows the lever 34 which rocks about its fulcrum 36 in accordance with the pull of the spring 44 or the solenoid 46. In order to stop the machine quickly when the clutch 26 is disengaged, there is a brake 60 on the crank shaft 20. This brake 60 is applied by a spring 62 and is released by a solenoid 64 that operates in opposition to the spring 62 when the solenoid 64 is energized. The clutch-engaging solenoid 46 and the brake-releasing solenoid 64 are supplied with power from the same source so that the brake 60 is applied instantly whenever the clutch 26 is disengaged. The brake 60 and its operating mechanism, which are shown diagrammatically in FIGURE 2, are merely representative of means for stopping the machine when the power supply is shut off.

FIGURE 2 is also a wiring diagram showing the circuit controllers of this invention and their correlation with one another. The power is supplied to the clutch solenoid 46 and the brake solenoid 64 through a conductor 68. This conductor 68 is connected with the fixed end of a reed 70 in a reed switch 72. The reed 70 is spaced from another reed switch contact 74 when there is no power supplied to an operating coil 76 of the reed switch 72. When the coil 76 is energized, the contact 74, which is made of ferrous material, flexes toward the left in FIGURE 2 and touches the other contact of the switch 72. This closes one of the circuits through which power is supplied to the conductor 68.

There is a parallel circuit through which the conductor 68 can receive power when the switch 72 is open. This parallel circuit leads from a power supply line 78 through reed switches 81, 82 and 83, connected in series with a conductor 85 which connects with the conductor 68. Thus, if all of the reed switches 81, 82 and 83 are closed, the clutch solenoid 46 and brake solenoid 64 are supplied with power from the power source 78.

The reed switch 81 has a magnetic operating coil 91 which closes the reed switch 81 when the coil 91 is energized. The reed switches 82 and 83 have operating coils 92 and 93, respectively. These operating coils 91, 92 and 93 are connected in parallel with a conductor 95 which receives current from a power source 96 through still another reed switch 98.

The reed switch 98 is a double-pole, double-throw switch with a reed 100 which is normally held in contact with a right-hand reed 102 by spring bias. The reed switch 98 has an electro-magnetic operating coil 106 which, when energized, pulls the reed 100 into contact with a left-hand reed 108. The reed switch 98 is closed, therefore, and supplies power to the conductor 95 at all times except when the operating coil 106 is energized. In the operation of the invention, this coil 106 receives a single pulse of current once during each cycle of the machine to momentarily interrupt the circuit through the switch 98 for purposes which will be apparent in considering the operation of the other circuit controllers.

The operating coil 91 of the reed switch 81 is connected by a conductor 110 to the detector 50 and the finger 52. This finger 52 is located closed to a support 112 along which a work piece 114 travels from the work station 14 to the next work station.

The support 112 is made of electrically conductive material and the work piece 114 is also electrically conductive. The clearance between the finger 52 and the support 112 is less than the height of the work piece 114 so that the work piece strikes and flexes the finger 52 as the work piece passes the detector 50. This establishes a grounding circuit from the conductor 110 through the detector 50, finger 52 and work piece 114 to the support 112 which forms a part of the frame of the machine. This completes the circuit from the power source 96 through the operating coil 91 of the reed switch 81 and causes the operating coil 91 to move the reeds of the switch into position to close the switch 81.

The switch 81 includes four reeds, 121, 122, 123 and 124. The first of these reeds 121 and 122, when brought into contact with one another, establish a holding circuit from the coil 91 to a grounding connection 126 so that the coil 91 remains energized after the work piece 114 has passed beyond the finger 52 and broken the circuit of the conductor 110.

The reed 123 connects with the power source 78 and the reed 124 connects with a conductor 128 leading to the next reed switch 82.

The reed switches 82 and 83 are of similar construction to that already described for the reed switch 81. The operating coil 92 connects with the detector 50 and finger 52 which are located beyond the work station 15 (FIGURE 1); and the operating coil 93 connects with the detector 50 and finger 52 which are located beyond the work station 16. Except for the operating coils, the elements of the reed switches 82 and 83 which correspond to the elements of the reed switch 81 are indicated by the same reference characters as in the reed switch 81.

Referring again to FIGURE 2, the operating coil 106 of the reed switch 98 is connected across a secondary coil 140 of a transformer 142. A rectifier 143 limits the flow of current in the secondary coil 140 to one direction. This transformer 142 has a primary coil 144 connected at one side to the power source 96 and connected on the other side, by a conductor 146, to a brush 148 which is urged against a commutator 150 by a spring 152. This commutator 150 provides a ground connection, on the frame of the machine, during a portion of each cycle of the machine.

In the construction illustrated, the commutator 150 has an insulating segment 156 and a conducting segment 158. The commutator 150 rotates as a unit with the crank shaft 20 and each of the segments 156 and 158 extends for 180° of the commutator.

The commutator 150 closes the circuit through the transformer coil 144 during one half of each cycle of the machine. It also provides the ground connection for closing the circuit through the operating coil 76 of the reed switch 72, this coil 76 being connected on one side with the power source 96 and on the other side with the conductor 146.

The reed switch 72 is open, therefore, during one half of each cycle of operation of the machine.

In the broad aspects of the invention, the commutator 150 is merely representative of means for supplying power to the coils 76 and 144 during a pre-selected portion of each cycle of the machine. It will be understood that the 180° portion of the cycle is merely illustrative and that the apparatus can be designed to operate with the power supply to these coils continuing for different parts of the cycle.

FIGURE 3 shows the cycle of the machine represented as a sine curve 166. The top of the waves represent the instants when the ram 18 is at the top of its stroke; and the bottom of each wave represents the lower end of the stroke of the ram. The light portions of the curve 166 represent the times when the conducting segment 158 is in contact with the brush 148, and the shaded portions of the curve represent the times when the non-conducting segment 156 is in contact with the brush 148.

FIGURE 4 shows the construction of the reed switch 98. The reeds are enclosed in a tube 170. Three conductors 172, 173 and 174 extend through a lower end of the tube which is hermetically sealed by a seal 176. The conductor 172 extends up to the top of the tube and connects with the reed 100 which extends downward from a fixed support 178 near the top of the tube.

The lower end of the reed 100 extends between contacts which are preferably the upper ends of the other reeds 102 and 108. The coil 106 surrounds the tube 170. The conductors 173 and 174 are connected to the lower ends of the reeds 102 and 108, respectively. This construction is illustrative of conventional reed switches, and various switch constructions can be used for this invention.

Reviewing the operation of the circuits shown in FIGURE 2, the fingers 52 of the detectors 50 temporarily ground the circuits of the operating coils 91, 92 and 93 of the switches 81, 82 and 83, respectively as work pieces 114 contact the fingers 52 beyond each of the work stations. This temporary closing of the circuits of the operating coils 91, 92 and 93 causes the switches 81, 82 and 83 to close. This establishes a holding circuit for each of the coils by bringing the reeds 121 and 122 together. Thus the operating coils 91, 92 and 93 remain energized after the work pieces pass beyond the fingers 52 of the detectors 50.

Closing of the series connected switches 81, 82 and 83 establishes a circuit from the power source 78 through the reeds 123 and 124 of switch 81 and through the conductor 128 to the reeds 123 and 124 of switches 82 and 83 and to the conductors 85 and 68 so as to supply current to energize the solenoids 46 and 64. As long as these solenoids 46 and 64 are energized, the machine continues in operation.

If there is no work piece delivered past the finger 52 which momentarily grounds the operating coil 92 of switch 82, then that switch will not be closed, and even though the other two switches 81 and 83 are closed, no current will be supplied to the conductor 85 because the switches are connected in series. Thus the series connected switches 81, 82 and 83 insure that work pieces are transferred from every work station and that the machine is operating normally or the switches 81, 82 and 83 will not deliver power to conductor 85.

The transfer of work pieces occurs while the brush 148 is in contact with the conducting segment 158 and during this time, the operating coil 76 of the reed switch 72 is energized and the reed switch 72 is closed so that current is also supplied to the solenoids 46 and 64 from the conductor 96, through the closed reed switch 72 and through the conductor 68.

When the ram 18 is descending and the commutator 150 brings the non-conducting segment 156 into contact with the brush 148, the circuit through the coil 76 of the reed switch 72 is broken and this switch opens. The circuit through the coil 144 of transformer 142 is also broken and the decay of the magnetic field in the transformer would produce a pulse in the coil 106 of reed switch 98, but the rectifier 143 is oriented so as to prevent current from flowing in the coil 106 during times when the magnetic field of the transformer is decaying. The transformer 142 supplies a pulse to the coil 106 only when the magnetic field is building up in the transformer and this occurs only once in each cycle when the conductor segment 158 moves into contact with the brush 148.

Even though the switch 72 opens when the insulating segment 156 moves into contact with the brush 148, the switches 81, 82 and 83 continue to supply power to the solenoids 46 and 64 to keep the machine in operation. The ram reaches the bottom of its stroke and starts up again, as shown in FIGURE 3, and during this upward movement the brush 48 again contacts with the conductor segment 158. This grounds the circuits of the coils 76 and 144. It causes the switch 72 to close and causes the magnetic field of the transformer 142 to build up and send a surge of current through the coil 106 of the reed switch 98 so that the reed switch 98 opens and breaks the circuits to the operating coils 91, 92 and 93 of the switches 81, 82 and 83. Thus the supply of current through the conductor 85 is terminated, but current is still supplied through the conductor 68 to the solenoids 46 and 64 because the switch 72 is closed.

When the direct current supplied to the transformer coil 144 reaches full strength, there is no longer any current induced in the secondary coil, and the coil 106 of the switch 98 becomes deenergized so that the reed 100 moves back again into contact with the reed 102. This does not close the switches 81, 82 and 83 again, however, because the contacts 121 and 122 of the switches 81, 82 and 83 have opened.

During the time when the conducting segment 158 is in contact with the brush 148, the machine transfers work pieces which were operated on by the ram during the previous stroke. The transfer of these work pieces ground the fingers 52 of the detectors 50 and again closes the switches 81, 82 and 83 if work pieces are properly transferred from all work stations. The circuit is again conditioned, therefore, to supply power to the solenoids 46 and 64 during the next half cycle during which the insulating segment 156 is in contact with the brush 148, and thus power is supplied to the solenoids 46 and 64 cycle after cycle as long as there are transfers of work pieces from all stations after each operation.

The preferred embodiment of the invention has been illustrated and described, but changes and modifications can be made and some features can be used in different combinations without departing from the invention as defined in the claims.

What is claimed is:

1. The combination, with a machine that operates through repetitive cycles and that has a station where an operation is performed on successive work pieces by cyclic means moved toward and from the work piece at said station with each cycle of operation of the machine, of (a) driving mechanism that supplies power to the machine,
    (b) stop mechanism for interrupting the supply of power,
    (c) an actuator for the stop mechanism,
    (d) two electric circuits connected in parallel with one another and each of which, when in operative condition, prevents operation of the actuator,
    (e) a first circuit controller that maintains one of said electric circuits in its operative condition during a pre-determined part of each cycle of the machine,
    (f) a second circuit controller including a switch having flexible magnetic contact elements and an electric magnet for moving the electric contact elements, and
    (g) a finger in the path of movement of a work piece from said station,
    (h) the finger being in the circuit of the magnet and effective upon contact with the work piece to energize the circuit of the magnet and operating the switch to put the other of said electric circuits in operative condition.

2. The combination described in claim 1 characterized by the first circuit controller being connected with the cyclic means in position to maintain its electric circuit in operative condition during the time of the cycle during which a work piece is discharged past the feeler during normal operation of the machine.

3. The combination described in claim 2 characterized by the second circuit controller having a contact on its switch that holds the switch in position to maintain its electric circuit in operative condition during the entire portion of the cycle of the machine except for that portion when the first circuit controller is maintaining its electric circuit in operative condition.

4. The combination described in claim 1 characterized by the machine having an electrically-conductive portion which is at ground potential and with which the work piece is in contact when it touches the finger, said finger being in the electric circuit of the magnet and grounding the circuit of the magnet through the work piece to said portion of the machine.

5. The combination described in claim 4 characterized by the switch being a switch in which the flexible magnetic contact elements are reeds of spring material, and one of the reeds has a contact that establishes a holding circuit to keep the magnet energized after the work piece has moved beyond the finger.

6. The combination described in claim 5 characterized by all of the contacts of the switch being enclosed in a container in which they are protected from the ambient atmosphere.

7. The combination described in claim 1 characterized by a power supply circuit to the second circuit through a portion of the first circuit, means for momentarily interrupting the power supply during each cycle of the machine, the second circuit having holding contacts with a bias toward open position whereby the holding contacts move into their open positions each time the power supply is momentarily interrupted.

8. The combination described in claim 1 characterized by the machine including a plurality of work stations at which operations are performed successively on a work piece, said means for advancing the work pieces from each work station to the next, a second electric circuit controller for each of the work stations, and each of the second electric circuit controllers having its finger in position beyond a different one of the work stations, and all of the magnets and fingers of the second electric circuit controllers being connected in parallel with a source of power.

9. The combination described in claim 8 characterized by the source of power being connected with the magnets through a part of the circuit of the first electric circuit controller, and the first electric circuit controller including means for interrupting the supply of power to the magnet momentarily during a part of the cycle of the machine while the first electric circuit controller is maintaining its circuit in operative condition.

10. The combination described in claim 8 characterized by means for interrupting the supply of power to the magnet momentarily including a reed switch, an electro-magnet for operating the switch, a transformer having a secondary coil connected across the electro-magnet, the transformer having also a primary coil through which power flows to the other part of the circuit of the first electric circuit controller whereby the magnet receives a pulse of power while current is initially building up in the primary coil of the transformer.

11. The combination described in claim 10 characterized by a switch operated by movement of a cyclically movable part of the machine for supplying power to the primary coil of the transformer.

12. The combination described in claim 8 characterized by the switches of the different second electric circuit controllers having contacts connected in series for all of the work stations so that the electric circuit which is conditioned by the second electric circuit controllers requires contact of work pieces with the fingers at all of the work stations in order to close the series circuit.

References Cited by the Examiner
UNITED STATES PATENTS

| | | | |
|---|---|---|---|
| 1,977,824 | 10/1934 | Fair | 192—125 |
| 2,337,132 | 12/1943 | Shaw | 192—125 |
| 3,023,283 | 2/1962 | Wintriss | 192—125 |

DAVID J. WILLIAMOWSKY, *Primary Examiner.*